United States Patent
Caiazzo et al.

(10) Patent No.: US 9,657,812 B2
(45) Date of Patent: May 23, 2017

(54) PLANETARY GEARING

(71) Applicant: DANIELI & C. OFFICINE MECCANICHE S.P.A., Buttrio (IT)

(72) Inventors: Domenico Caiazzo, Villa Vicentina (IT); Enzo Cognigni, Bologna (IT); Hermes Forabosco, Tavagnacco (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 86 days.

(21) Appl. No.: 14/434,641

(22) PCT Filed: Oct. 11, 2013

(86) PCT No.: PCT/IB2013/059307
§ 371 (c)(1),
(2) Date: Apr. 9, 2015

(87) PCT Pub. No.: WO2014/057468
PCT Pub. Date: Apr. 17, 2014

(65) Prior Publication Data
US 2015/0240915 A1    Aug. 27, 2015

(30) Foreign Application Priority Data

Oct. 11, 2012  (IT) .......................... MI2012A001712

(51) Int. Cl.
*F16H 1/28* (2006.01)
*F16H 57/08* (2006.01)
*F16C 27/04* (2006.01)

(52) U.S. Cl.
CPC ......... *F16H 1/2836* (2013.01); *F16H 57/082* (2013.01); *F16C 27/04* (2013.01); *F16C 2361/61* (2013.01); *F16H 2057/085* (2013.01)

(58) Field of Classification Search
CPC .............................. F16H 1/2827; F16H 1/2836
See application file for complete search history.

(56) References Cited

U.S. PATENT DOCUMENTS

| | | | | |
|---|---|---|---|---|
| 3,635,103 | A | * | 1/1972 | Monti ..................... F16C 23/10 384/255 |
| 5,102,379 | A | * | 4/1992 | Pagluica ............... F16H 1/2836 475/159 |
| 6,117,041 | A | * | 9/2000 | Avery ................... F16H 1/2836 475/347 |

FOREIGN PATENT DOCUMENTS

| | | |
|---|---|---|
| CN | 201714821 | 1/2011 |
| CN | 201714918 | 1/2011 |

(Continued)

OTHER PUBLICATIONS

International Search Report and Written Opinion for International Application No. PCT/IB2013/059307; Mar. 3, 2014; 8 pages.

*Primary Examiner* — Tisha Lewis
(74) *Attorney, Agent, or Firm* — Stetina Brunda Garred & Brucker (57) ABSTRACT

A planetary gearing which includes a predetermined number of planet gears and a planet gear carrier with two walls on which the planet gears are mounted, supported by supporting pins defining a respective axis and the ends of which are fixed to a respective wall of the planet gear carrier, wherein each supporting pin is provided with, at an end thereof, an annular groove obtained in the thickness thereof, and wherein the groove has an extension along the axis lower than the extension of the meshing band of the planet gear along the axis. A ring may be provided partly inserted in the groove and having a profile equal to that of the portion of groove in which it is inserted. Such a ring acts as a mechanical stop for the yielding part of the pin which yields, under a predetermined load, up to a contact with the ring.

21 Claims, 6 Drawing Sheets

(56) References Cited

FOREIGN PATENT DOCUMENTS

| DE | 3736540 A1 * | 5/1989 | ............. F16H 55/14 |
|----|----|----|----|
| EP | 2270361 | 1/2011 | |
| KR | 20080002166 | 1/2008 | |

* cited by examiner

PLANETARY GEARING

CROSS REFERENCE TO RELATED APPLICATIONS

The present application claims priority to PCT International Application No. PCT/IB2013/059307 filed on Oct. 11, 2013, which application claims priority to Italian Patent Application No. MI2012A001712 filed Oct. 11, 2012, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a planetary gearing, that is a wheelwork equipped with a sun gear, planet gears and planet gear carriers, used as a speed reducer.

PRIOR ART

Planetary gearings are mechanical gear systems in which the central wheel or pinion, called sun gear (sun wheel), which generally is the motion input, distributes the applied load to the planet gears surrounding it and which in turn mesh with an internal gear. In addition to having a revolutionary motion about their own axis, planet gears also rotate integrally with the structure of a planet gear carrier member, called a train carrier or also differential bevel, on which they are assembled, supported by specific pins and by rolling bearings. The axis of rotation of the planet gear carrier and of the sun gear coincide.

In a planetary system, the structure of the planet gear carrier may have two walls or projecting pins. Since the supporting pins of the planet gears rest on both ends of the respective walls of the planet gear carrier, planet gear carriers with two walls generally allow larger widths of meshing bands to be used and resistance to larger loads to be obtained and, therefore, increased performance with respect to planet gear carriers with projecting pins.

Planet gear carriers generally have a concentration of loads, transmitted through the pins towards the wall of the planet gear carrier, which is localized at the motion output side, that is the side of the planetary system from which the projection of the supporting pins of the planet gears is longer. The loads transmitted lessen instead at the other side of the planetary system, opposite to the motion output side. An unbalance of such a system translates into an increasing misalignment of the pins of the planet gears as the torque transmitted increases. This results in a non-homogeneous distribution of the linear load along the sides of the gear teeth which mesh with each other (sun-planets and planets-gear) and also a non-uniform division of the tangential loads among all the planet gears in the system.

Systems have been developed for planet gear carriers with projecting pins adapted to increase the flexibility thereof, as described for example in documents US2010/0077881 and U.S. Pat. No. 8,075,443. The solutions indicated in these documents refer to projecting planet gear carriers, i.e. with supporting pins of the planet gears fixed to a single wall, and provide the use of a special bearing characterized in that it has an elongated inner bearing ring, i.e. much broader with respect to the outer ring, that is fixed to the pin, so as to make the system more flexible. These systems may therefore only function with this special bearing, which costs more on the market than standard bearings.

In a planetary gearing with a planet gear carrier with two walls, the distribution of the load on the gears is correlated with the flexible system consisting of the planet gear carrier with two walls, the connecting spokes between the two opposite walls and the supporting pins which define the seats of the supporting bearings of the planet gears.

However, the portions of the total torque transmitted through the planet pins to the two opposite walls of the planet gear carrier determine a different behaviour of the two walls of the planet gear carrier and this results in a significant misalignment of the supporting pins, as the loads are concentrated towards one of the two ends (motion output) thus significantly decreasing the transmission capacity of the planetary system. Furthermore, the misalignment problems become more significant as the number of actual planet gears increases, and may result in the pitting phenomenon, i.e. the formation of cavities on the gears and the successive formation of cracks. To make up for the misalignment, the teeth of the gears are often crowned, but this solution is not sufficient or may even become counterproductive for all load levels.

Thus the need is felt to make a planetary gearing which allows overcoming the aforesaid drawbacks.

SUMMARY OF THE INVENTION

The main object of the invention is to provide a planetary gearing which allows the planet gear carrier with two walls to have the flexibility required to manage the unevenness of the load in an optimal manner and which redistributes the misalignment due to the torque acting on the supporting bearings of the planet gears and on the meshing bands of the teeth, so as to increase the transmission capacity of the planetary system.

A further object of the invention is to provide a planetary gearing in which the planet gear carrier with two walls has a controlled flexibility, with a maximum safety limit. Another object of the invention is to provide a planetary gearing with planet gear carrier with two walls capable of managing the misalignment of the supporting pins of the planet gears, of interacting with standard rolling bearings, thus not requiring dedicated bearings, and of ensuring these standard bearings have increased durability with respect to that obtained in current systems.

Thus the present invention proposes to achieve the above-mentioned objects by providing a planetary gearing which, according to claim 1, comprises a predetermined number of planet gears provided with a meshing band; a planet gear carrier, equipped with two walls, on which the planet gears are mounted; supporting pins which support the planet gears and define a respective longitudinal axis, each supporting pin comprising:

a first end segment fixed to a first wall of said two walls,
a second end segment fixed to a second wall of said two walls,
a third central segment having diameter larger than the diameter of said second end segment whereby an annular shoulder is defined between the third central segment and the second end segment, wherein an annular groove is provided on said annular shoulder, the annular groove having a depth along the longitudinal axis lower than the extension of the meshing band of the planet gear along the same longitudinal axis, whereby an annular end portion of said central segment, which surrounds said annular groove, defines a yielding area of the supporting pin;

and wherein a ring, having a rigidity greater than or equal to the rigidity of said annular end portion, is at least partly inserted in the annular groove to act as a mechanical stop for said yielding area which, under load, may yield up to a contact with the ring.

The invention provides the introduction, in the planet gear carrier, of areas that yield under load quantified according to the global deformability of the planet gear carrier, to the loads in place and to the scope of application, so as to minimize or cancel the effect due to the misalignment of the pins under load or due to the minimum construction errors in the system.

The invention provides the use of longitudinal supporting pins with different diameters, which on the motion output side, i.e. the side on which the loads are most concentrated, have a cylindrical or truncated cone shaped groove, preferably made by removing material, which determines a yielding area of the pin.

The groove on the pin gives the pin a certain degree of flexibility based on the axial depth and height of said groove: the presence of a yielding area at one end of the pin, on the output side of the motion from the planetary system, allows part of the loads, which are normally concentrated in this point, to be brought to the most rigid area of the pin, thereby decreasing the misalignment effect of the walls and bringing the load distribution transmitted towards the middle of the meshing band.

Therefore, the groove constitutes the flexible element capable of modifying the load distribution on bearings and gears; the axial processing depth, taper degree and predetermined thicknesses allow the deformability of the pin to be related with the general rigidity of the planet gear carrier and with the external load applied. Hence, different designs of the groove and of the yielding area allow calibrating the intervention torque range by adapting the different pins to the different applications in which they may be used.

A first variant of the invention provides that the supporting pin of each planet gear is monolithic, made in a single piece, with the annular groove made by removing a part of material.

A second variant of the invention instead provides that the supporting pin of each planet gear is formed by two different pieces: a first smooth piece and a second piece in the shape of a shaped sleeve, arranged coaxially to said first piece, so as to define the aforesaid groove along with the first piece. This second variant is easier to make especially for increasingly larger gearing dimensions.

In order to make the flexible element more effective and protect it in case of overloads, both variants may advantageously provide the insertion of a safety element against external overloads in such a manner so as to limit the deformation of the groove above a given torque value. Due to this safety element in the form of a mechanical deformation stop inserted in the groove, the yielding area of the pin only yields up to a maximum predetermined quantity, to prevent excessive loads from damaging it. In particular, permanent pin deformation is prevented, or even breakage of the yielding part is prevented.

The deformation stop of the yielding part of the pin is made by at least partly introducing a metal safety ring in the pin groove, said safety ring having substantially the same truncated cone or cylindrical shaped profile as said groove.

Advantageously, once the safety ring is inserted in the groove, there is a gap between the outer surface of the ring and the corresponding inner surface of the groove, that is the inner surface of the annular end portion of the central segment of the supporting pin, whereby the gap allows the maximum flexibility of the supporting pin to be adjusted in case of overloads.

The dimensions of this gap are designed so as to limit the deformations of the yielding end area of the pin to a predetermined value. Indeed, the gap between the groove and the mechanical stop provides the pin the desired flexibility range, such gap quantifying the yielding of the pin and determining the operative range thereof. In case of loads which place the yielding area in contact with the mechanical stop, the operative range of the pin is left, which does not have further forms of flexibility and behaves as a classical pin, with constant rigidity along the entire length thereof.

The shape of the profile of the outer surface of the safety ring corresponds to the shape of the profile of the corresponding inner surface of the annular end portion of the central segment of the pin.

Advantageously, an inner ring of at least one bearing, arranged between each supporting pin and the respective planet gear, is a different part from the supporting pin. Advantageously the flexible supporting pin of the planet gears in the gearing according to the invention is interchangeable with a standard pin or with other flexible pins with different features.

The planetary gearing, subject of the present invention, may for example be advantageously applied as a control gearing for flatteners for flat products, control gearing for a coiler spindle and in amplifiers for the generation of wind energy.

The dependent claims describe preferred embodiments of the invention.

BRIEF DESCRIPTION OF THE DRAWINGS

Further features and advantages of the invention will be more apparent in light of the detailed description of preferred, but not exclusive, embodiments of a planetary gearing, disclosed by way of a non-limiting example, with the aid of the accompanying drawings in which:

FIG. 2b represents a second, partly sectional, perspective view of the part in FIG. 2a;

FIG. 4b represents a sectional view of the component in FIG. 4a;

FIG. 6b represents a sectional view of the component in FIG. 6a.

The same numbers and the same reference letters in the figures identify the same elements or components.

DETAILED DESCRIPTION OF THE INVENTION

Figure 1:
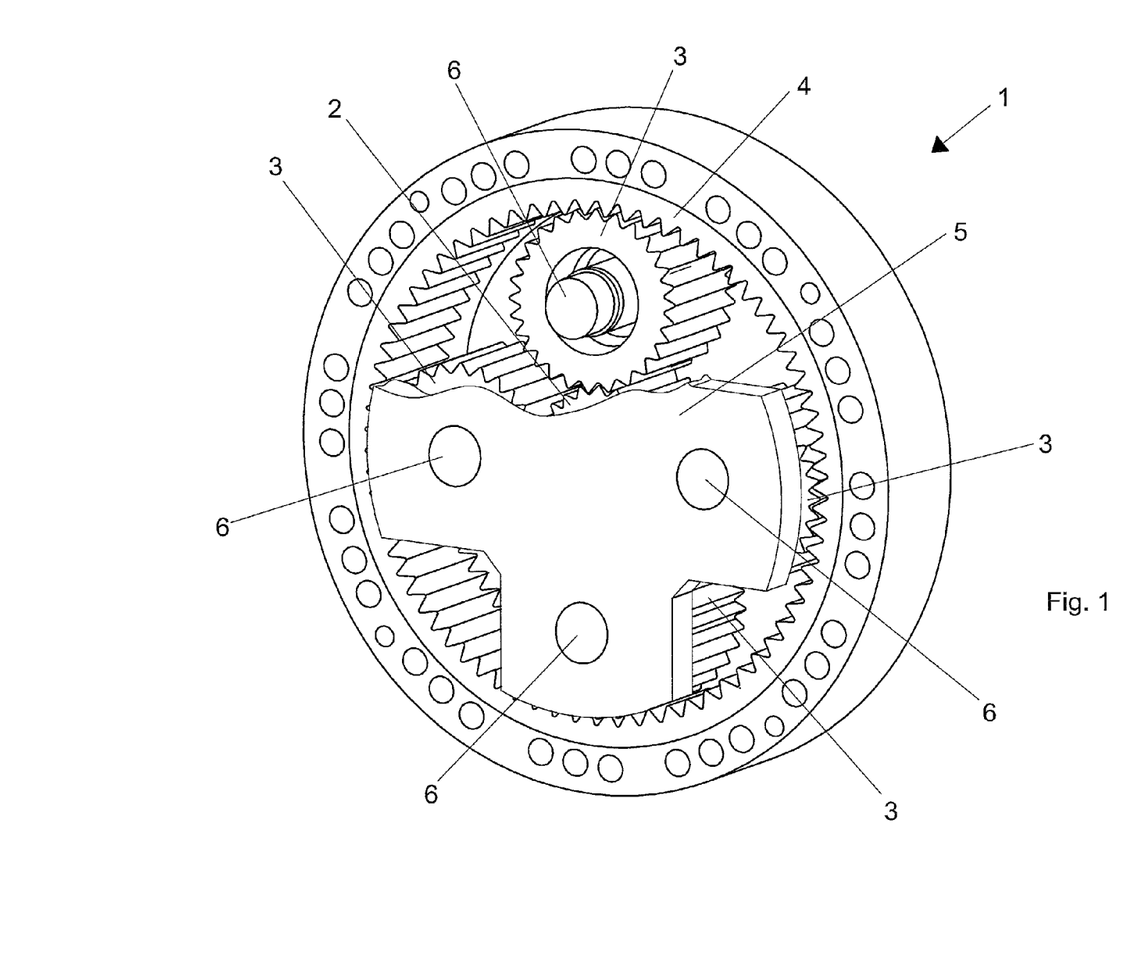
FIG. 1 represents a perspective view of a planetary gearing according to the invention.

FIG. 1 represents a planetary gearing, object of the present invention, which is globally indicated with numeral 1 and comprises:

a central wheel or pinion 2, called sun gear or simply sun wheel, through which the motion is input into the gearing;

a predetermined number of planet gears 3 (planet wheels), for example in number of four, which surround and mesh the sun wheel 2;

an internal gear 4, which surrounds and meshes the planet gears 3.

In addition to having a revolutionary motion about their own axis, the planet gears 3 rotate integrally with the structure of a planet gear carrier or train carrier 5 on which they are assembled, supported by specific supporting pins 6, defining respective longitudinal axes X, and by bearings 7, for example rolling bearings, arranged on said pins 6. The axis of rotation of the planet gear carrier 5 and of the sun wheel 2 are coinciding.

The planet gear carrier 5 is of the type with two walls, with the supporting pins 6 fixed orthogonally to the walls 8 and 9 of the planet gear carrier.

Figure 2A:
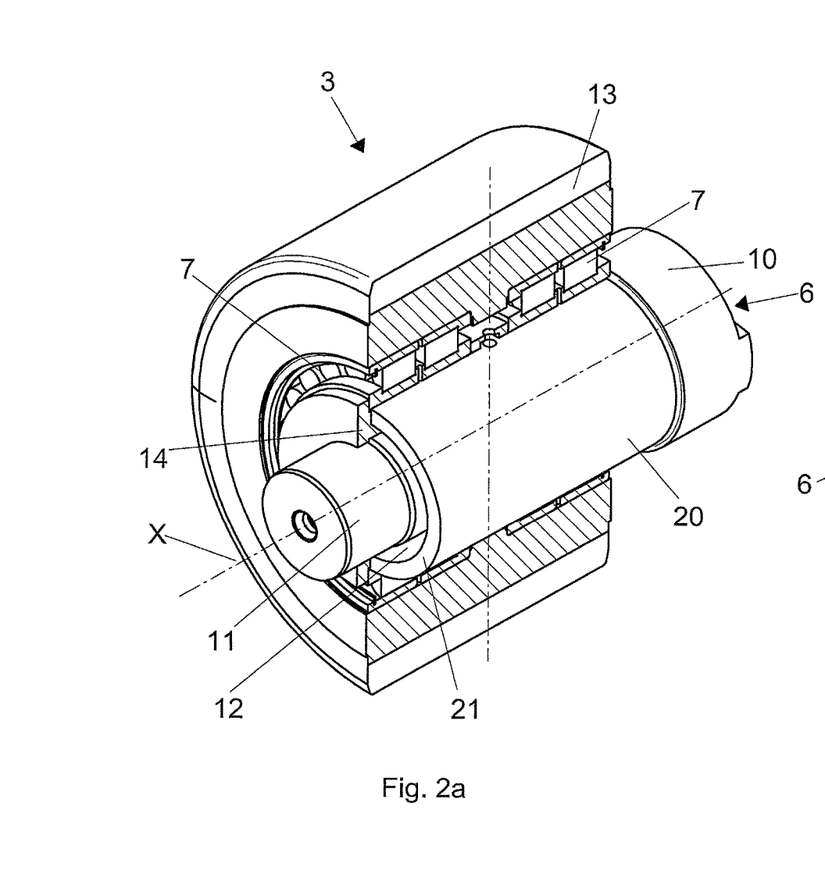
FIG. 2a represents a first, partly sectional, perspective view of part of a gearing according to the invention.
Figure 4A:
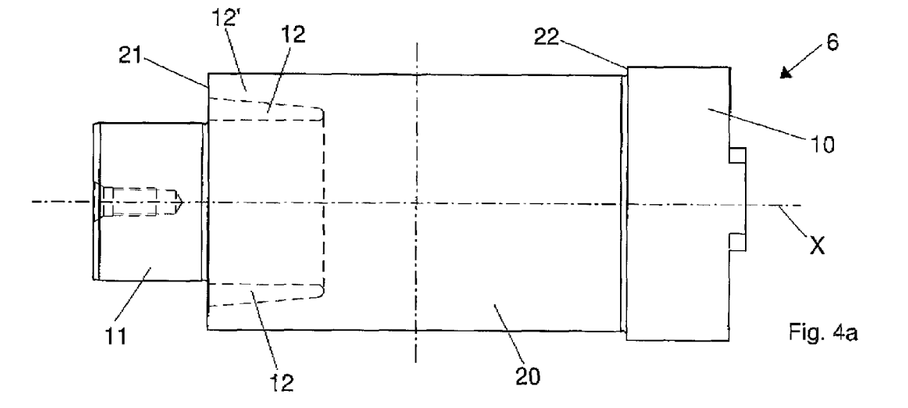
FIG. 4a represents a side view of a component of said first variant.
Figure 4B:
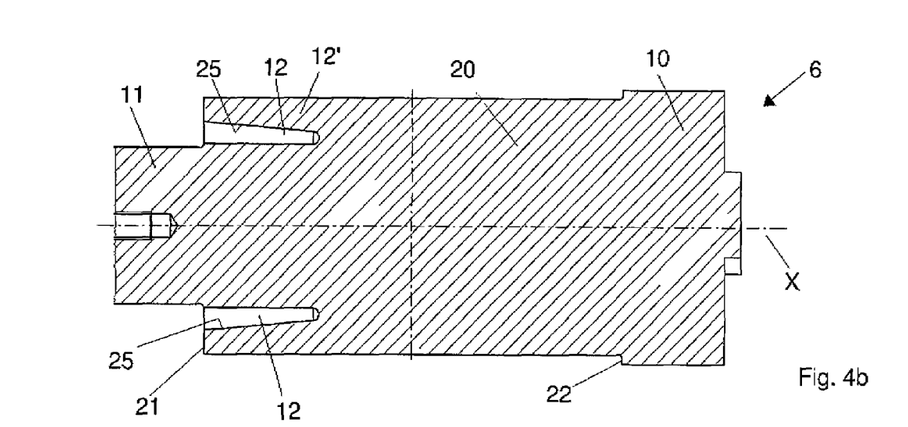

FIGS. 2a and 4b represent a first embodiment of the planetary gearing according to the invention, in which each supporting pin 6 is made in a single piece and comprises:

a first end segment 10 fixed to a first wall 8 of the planet gear carrier 5, a second end segment 11 fixed to a second wall 9 of the planet gear carrier 5, and a third central segment 20 having diameter larger than the diameter of said second end segment 11 whereby an annular shoulder 21 is defined between the third central segment 20 and the second end segment 11.

Figure 2B:
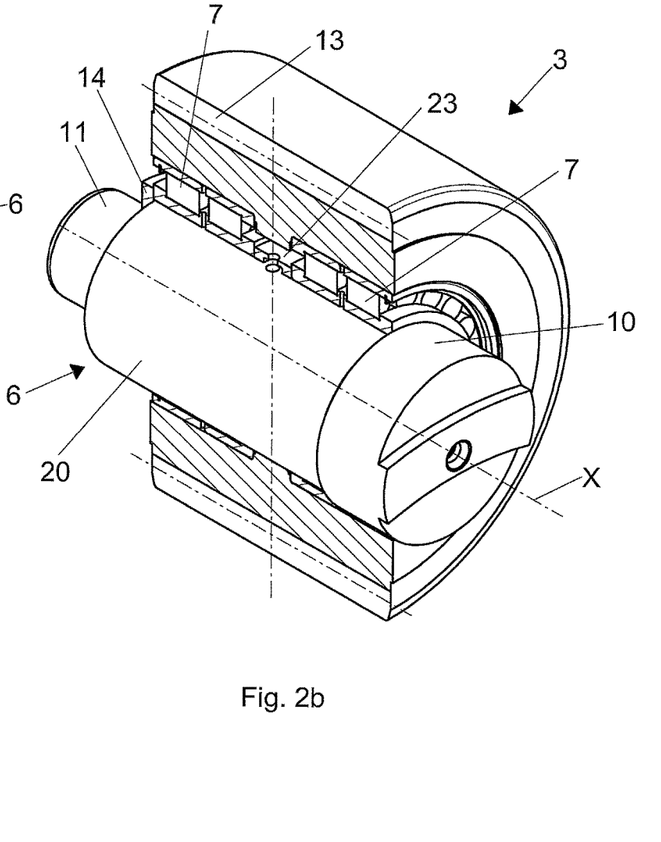

The first end segment 10 in turn has a diameter larger than the diameter of the third central segment 20 so as to define a further shoulder 22 for resting the inner ring of a bearing 7 housed on said third central segment 20. In the example in FIGS. 2 and 3, two bearings 7 are provided resting on the central segment 20 of pin 6, for example bearings with a double row of cylindrical rollers, and separated by a spacer 23. Alternatively, a different number of bearings—even just one—and other types of rolling bearings may be provided.

The possibility is not excluded of providing the first end segment 10 and third central segment 20 with equal diameter.

Unlike solutions of the state of the art, the inner ring of at least one bearing 7, arranged between the supporting pin 6 and the respective planet gear 3, is a completely distinct part from said supporting pin. The bearings are standard bearings, and therefore more affordable.

Advantageously, an annular groove 12, obtained by means of processing to remove material, is provided on the annular shoulder 21 having a depth along the longitudinal axis X lower than the extension of the meshing band 13 of the planet gear 3 along the same longitudinal axis X.

Figure 3:
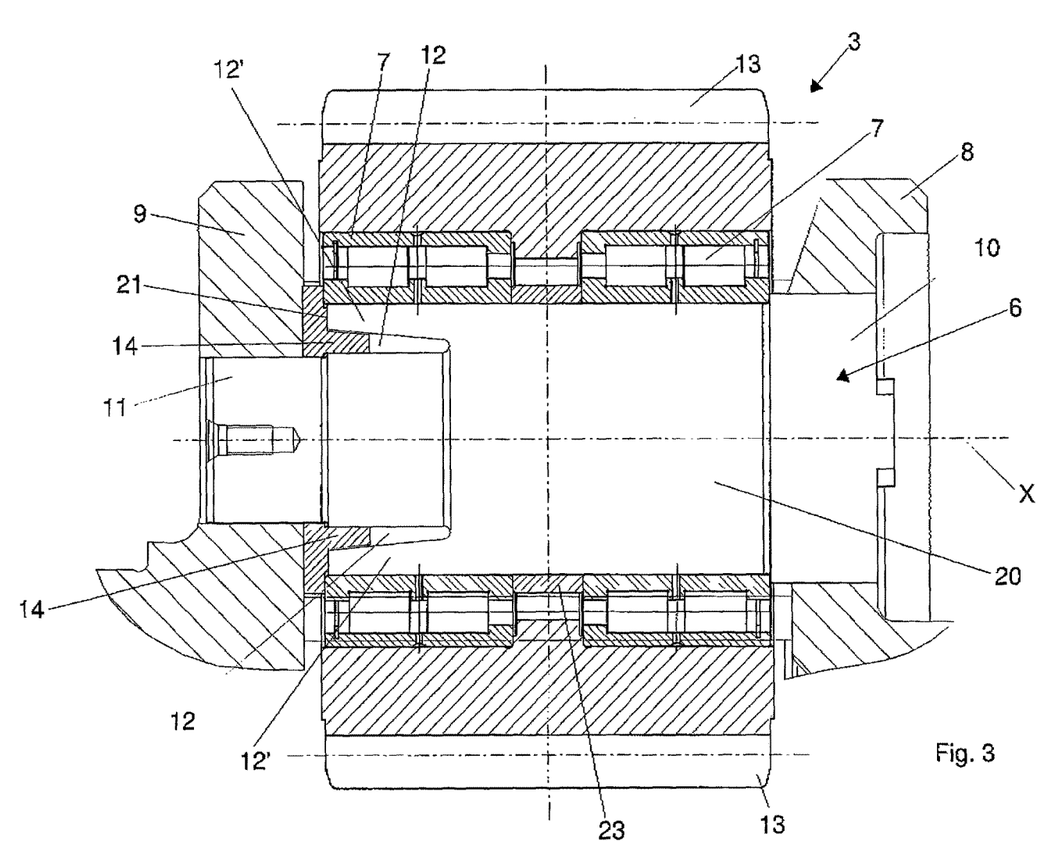
FIG. 3 represents a partly sectional view of a first variant of the gearing according to the invention.
Figure 5:
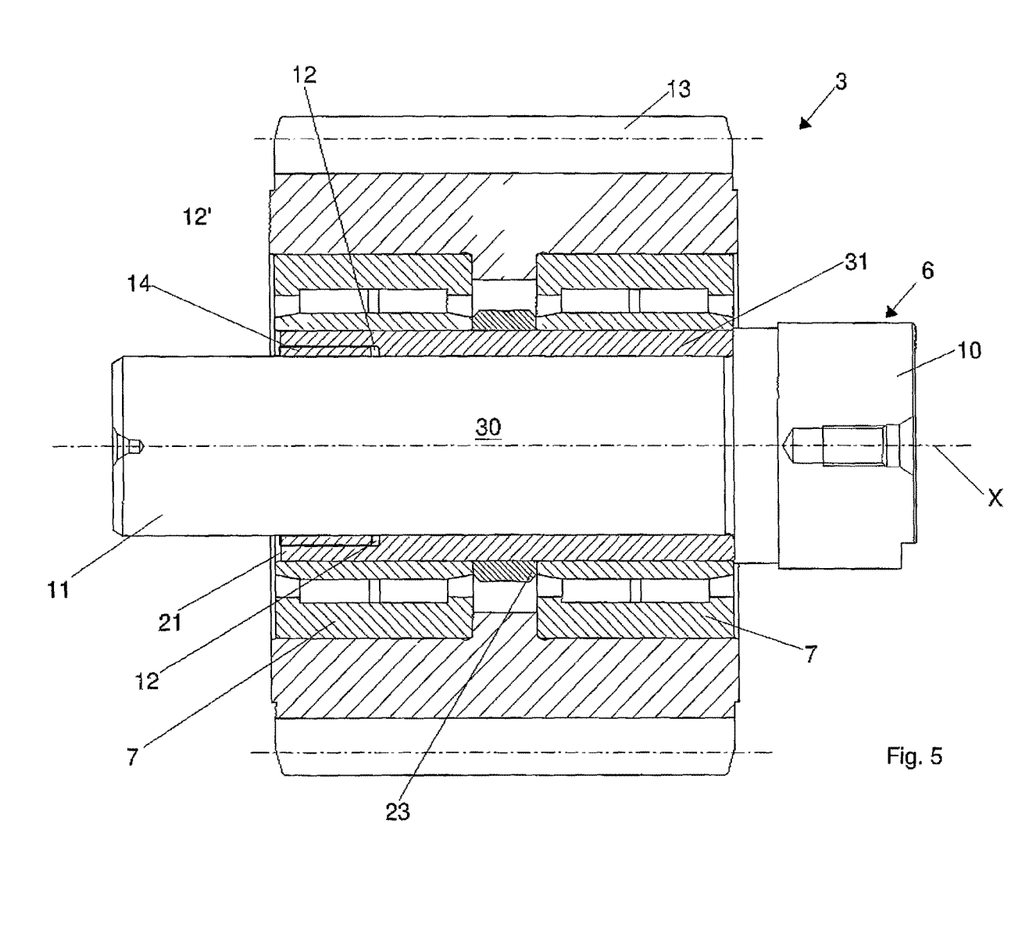
FIG. 5 represents a partly sectional view of a second variant of the gearing according to the invention.

Meshing band or band width is the longitudinal extension along the axis X of the flanks of the gear teeth in contact, i.e. the width of the toothed wheels which mesh with each other (see FIGS. 3 and 5).

The annular groove 12 is advantageously made at the end segment 11 corresponding to the output side of the motion from the gearing, i.e. the side on which the loads are normally concentrated. The presence of the groove 12 defines a yielding area on the supporting pin 6 which allows a part of the loads to be brought back to the non-yielding, therefore more rigid, area of the pin and to redistribute the misalignment among the two walls 8, 9 which occurs when the effects of the transmitted torque intervene. Said yielding area is represented by an annular end portion 12' of the central segment 20 of pin 6, said annular portion 12' surrounding the annular groove 12 externally.

Good results in this sense have been obtained by providing the extension of the annular groove 12, along the longitudinal axis X, equal to no more than 50% of the longitudinal extension of the meshing band 13 along the same axis X.

Excellent results in particular have been obtained by providing the extension of the annular groove 12, along the longitudinal axis X, comprised between 20% and 50% of the extension of said meshing band 13.

A further advantage may be represented by providing a rigid ring 14, preferably of metal material, at least partly inserted in the annular groove 12 and having a corresponding profile substantially equal to that of the portion of groove 12 in which is inserted. Such a ring 14, having a rigidity greater than or equal to the rigidity of said annular end portion 12', acts as a mechanical stop for the yielding area of pin 6 which yields, under a predetermined load, up to a contact with said ring 14, i.e. acts as a mechanical stop of said annular end portion 12'. The ring 14 has a first portion inserted in the annular groove 12 and a second portion external to the annular groove 12 abutting on said annular shoulder 21 and which blocks the inner ring of at least one bearing 7 in position. Indeed, this second portion is arranged in direct contact with the inner ring of a bearing 7. The presence of said second outer portion of ring 14 determines an easier extraction of ring 14 from the annular groove 12 and the possibility of axially blocking the bearing 7.

In a preferred variant, as shown in the figures, the safety ring 14 is a solid ring, that is does not have any cavities therein.

Advantageously, the first portion of the ring 14 has an extension along the axis X within the annular groove 12 which is lower than the extension of said groove 12 along said axis X. Preferably, the longitudinal extension of said first portion is equal to no more than 80% of the extension of the groove 12 along the axis X. Even more preferably, the longitudinal extension of said first portion is comprised between 20% and 80% of the extension of the annular groove 12.

The stop ring 14 is advantageously placed in the maximum yield area under load, i.e. in the outer area of groove 12, where, thereby, it is easier to control even the smallest deformations.

Furthermore, the shape of the profile of the outermost surface, with respect to the longitudinal axis X, of the first portion of ring 14 is equal to the profile of the proximal inner surface of the annular groove 12. Such a profile is that of a cylindrical (FIG. 5) or truncated cone (FIG. 3) shaped side surface.

Advantageously, a gap is provided between said outermost surface of the first portion of ring 14 and said proximal inner surface of the annular groove 12 whereby the gap allows the maximum flexibility of the supporting pin 6 to be adjusted in case of overloads. This gap in particular determines the degree of maximum flexibility of the pin, i.e. the operative range thereof. Once the inner surface of the groove comes in close contact with the outermost surface of the first portion of ring 14, which acts as a mechanical stop, the yielding area of pin 6 no longer has the possibility of further yielding and hence acts as a standard pin, without yielding areas and flexibility.

Excellent results have been achieved by providing a value of said gap, when the gearing is stopped, which is variable from approximately 5/1000 to 15/1000 of the value of the maximum height of the groove, that is of the value of the maximum width of the groove along a direction perpendicular to the longitudinal axis X.

If the profile of groove 12 is that of a cylindrical side surface, the height of the groove, which remains constant along the axis X, is advantageously comprised between 20% and 40% of the longitudinal extension of the meshing band 13 along the axis X.

If the profile of groove 12 is that of a truncated cone side surface, the maximum height of the groove, close to the shoulder 21, is advantageously comprised between 20% and 50% of the longitudinal extension of the meshing band 13 along the axis X and the tilted surface 25 thereof has an angle of inclination equal to approximately 3°-7°, for example 5°, with respect to the axis X.

Figure 6A:
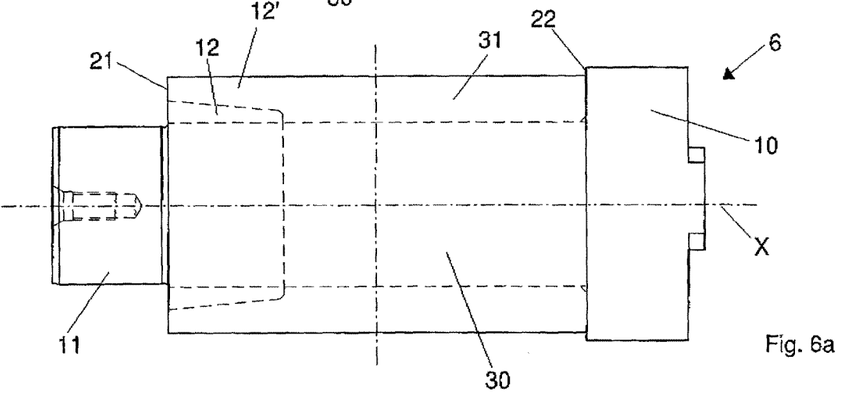
FIG. 6a represents a side view of a component of said second variant.
Figure 6B:
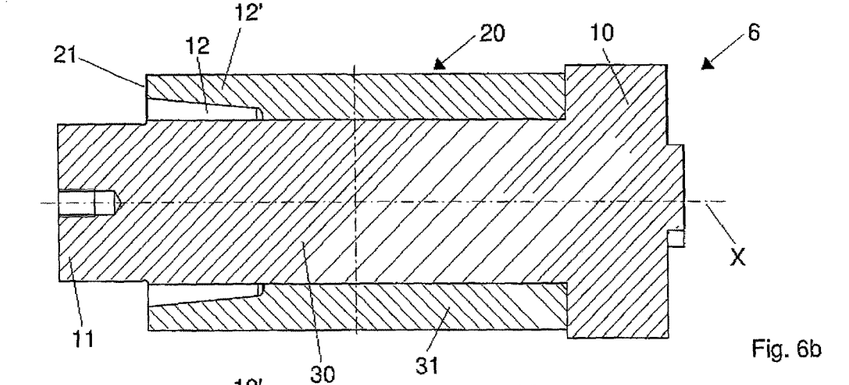

Figures from 5 to 6b represent a second embodiment of the planetary gearing according to the invention, for which the description for the first embodiment is valid, with the exception of the fact that each supporting pin 6 is not made in a single piece, but is formed by two pieces. A first piece of the supporting pin 6 comprises the first end segment 10, the second end segment 11 and a central body 30 of diameter substantially equal to the diameter of said second end segment 11. Such a first piece is thus a smooth pin, with a single possible variation of diameter between the first end segment 10 and the central body 30.

A second piece of the supporting pin 6 is a sleeve 31 externally arranged on said central body 30 and internally shaped at an end thereof so as to define, together with the central body 30, the annular groove 12 provided on the annular shoulder 21.

Thereby, similarly to the first embodiment, a yielding area of the supporting pin 6 is obtained due to the presence of groove 12 between the smooth pin and the sleeve.

A ring 14, preferably of metal material, may also be provided in this second embodiment, partly inserted in the annular groove 12 and having a profile equal to that of the portion of groove 12 in which it is inserted. Such a ring 14 acts as a mechanical stop for the yielding part of pin 6 which yields, under a predetermined load, up to a tight contact with said ring 14, i.e. acts as a mechanical stop for the annular end portion 12' of the central segment 20 of the supporting pin 6. Again in this second embodiment, ring 14 may have a first portion inserted in the annular groove 12 and a second portion external to the annular groove 12 abutting on said annular shoulder 21 and which blocks the inner ring of at least one bearing 7 in position. Furthermore, all the other technical features described above for the first embodiment are applicable to this second embodiment, such as, for example, those related to the extension along the axis X of the first portion of ring 14 within the annular groove 12, to the profile of said first portion of ring 14, to the gap between the outermost surface of the first portion of ring 14 and the proximal inner surface proximal of the annular groove 12, to the height of said groove.

Unlike the state of the art solutions, the inner ring of at least one bearing 7, arranged between the supporting pin 6 and the respective planet gear 3, is a completely distinct part from the sleeve 31 on which said at least one bearing 7 is housed. The bearings are standard bearings, and therefore more affordable.

The invention claimed is:
1. A planetary gearing comprising:
a predetermined number of planet gears provided with a meshing band,
a planet gear carrier, provided with two walls, on which the planet gears are mounted, supporting pins supporting the planet gears and defining a respective longitudinal axis,
each supporting pin comprising:
a first end segment fixed to a first wall of said two walls,
a second end segment fixed to a second wall of said two walls,
a third central segment having diameter larger than the diameter of said second end segment whereby an annular shoulder is defined between the third central segment and the second end segment,
wherein an annular groove is provided on said annular shoulder having a depth along the longitudinal axis lower than an extension of the meshing band of the planet gear along the same longitudinal axis, whereby an annular end portion of said central segment, which surrounds said annular groove, defines a yielding area of the supporting pin;
and wherein a ring, having a rigidity greater than or equal to the rigidity of said annular end portion, is at least partly inserted in the annular groove to act as a mechanical stop for said yielding area which may yield, under load, up to a contact with the ring.

2. A planetary gearing according to claim 1, wherein a gap is provided between an outer surface of the ring and a corresponding inner surface of the annular end portion, whereby the gap allows to adjust the maximum flexibility of the supporting pin in case of overloads.

3. A planetary gearing according to claim 2, wherein a shape of a profile of said outer surface of the ring corresponds to a shape of a profile of said corresponding inner surface of the annular end portion.

4. A planetary gearing according to claim 1, wherein an inner ring of at least one bearing, arranged between each supporting pin and the respective planet gear is a separate piece from the supporting pin.

5. A planetary gearing according to claim 1, wherein an extension along the longitudinal axis of the annular groove is equal to no more than 50% of the extension of said meshing band.

6. A planetary gearing according to claim 5, wherein the extension along the longitudinal axis of the annular groove is comprised between 20% and 50% of the extension of said meshing band.

7. A planetary gearing according to claim 1, wherein the ring has a first portion inserted in the annular groove and a second portion external to the annular groove abutting on said annular shoulder.

8. A planetary gearing according to claim 7, wherein an inner ring of at least one bearing, arranged between each supporting pin and the respective planet gear, is a separate piece from the supporting pin, and is blocked in position by said second portion of the ring, preferably in direct contact with said inner ring.

9. A planetary gearing according to claim 7, wherein a longitudinal extension of said first portion within the annular groove is lower than an extension of said annular groove along said longitudinal axis.

10. A planetary gearing according to claim 7, wherein a shape of a profile of an outermost surface, with respect to the longitudinal axis, of the first portion of the ring is equal to a shape of a profile of a proximal inner surface of the annular groove.

11. A planetary gearing according to claim 10, wherein said profile is that of a cylindrical or truncated cone shaped side surface.

12. A planetary gearing according to claim 10, wherein a gap is provided between said outermost surface of the first portion of the ring and said proximal inner surface of the annular groove whereby the gap allows to adjust the maximum flexibility of the supporting pin in case of overloads.

13. A planetary gearing according to claim 2, wherein said gap is variable from 5/1000 to 15/1000 of a maximum height of the annular groove.

14. A planetary gearing according to claim 12, wherein said gap is variable from 5/1000 to 15/1000 of a maximum height of the annular groove.

15. A planetary gearing according to claim 9, wherein the longitudinal extension of said first portion is equal to or no more than 80% of the extension of said annular groove.

16. A planetary gearing according to claim 15, wherein the longitudinal extension of said first portion is comprised between 20% and 80% of the extension of said annular groove.

17. A planetary gearing according to claim 1, wherein each supporting pin is made in a single piece.

18. A planetary gearing according to claim 1, wherein each supporting pin is formed by two pieces; a first piece comprising the first end segment, the second end segment and a central body of diameter substantially equal to the diameter of said second end segment; the second piece being a sleeve externally arranged on said central body and internally shaped so as to define the annular groove with said central body.

19. A planetary gearing according to claim 17, wherein an inner ring of at least one bearing is arranged between said supporting pin and the respective planet gear and is a separate piece from said single piece.

20. A planetary gearing according to claim 18, wherein an inner ring of at least one bearing is arranged between said supporting pin and the respective planet gear and is a sepatate piece from said sleeve.

21. A planetary gearing according to claim 1, wherein a central gear, surrounded by and meshing with said predetermined number of planet gears, and an internal gear, which surrounds and meshes the planet gears, are provided.

* * * * *